United States Patent
Esaka

(10) Patent No.: US 9,736,217 B2
(45) Date of Patent: Aug. 15, 2017

(54) METHOD, ELECTRONIC DEVICE, AND COMPUTER PROGRAM PRODUCT

(71) Applicant: Kabushiki Kaisha Toshiba, Tokyo (JP)

(72) Inventor: Naoki Esaka, Kawasaki (JP)

(73) Assignees: Kabushiki Kaisha Toshiba, Tokyo (JP); Toshiba Visual Solutions Corporation, Aomori (JP)

(*) Notice: Subject to any disclaimer, the term of this patent is extended or adjusted under 35 U.S.C. 154(b) by 70 days.

(21) Appl. No.: 14/281,648

(22) Filed: May 19, 2014

(65) Prior Publication Data

US 2014/0380183 A1 Dec. 25, 2014

Related U.S. Application Data

(63) Continuation of application No. PCT/JP2013/066884, filed on Jun. 19, 2013.

(51) Int. Cl.
| | |
|---|---|
| *G06F 3/0481* | (2013.01) |
| *H04L 29/08* | (2006.01) |
| *H04M 1/725* | (2006.01) |
| *G08C 17/02* | (2006.01) |
| *H04M 1/67* | (2006.01) |

(52) U.S. Cl.
CPC .......... *H04L 67/025* (2013.01); *G06F 3/0481* (2013.01); *G08C 17/02* (2013.01); *H04M 1/72533* (2013.01); *G08C 2201/20* (2013.01); *G08C 2201/30* (2013.01); *H04M 1/67* (2013.01)

(58) Field of Classification Search
CPC .................. H04L 29/08; G06F 3/0481
See application file for complete search history.

(56) References Cited

U.S. PATENT DOCUMENTS

| | | | |
|---|---|---|---|
| 2008/0180228 A1* | 7/2008 | Wakefield | G01S 5/0252 340/4.62 |
| 2008/0282182 A1* | 11/2008 | Oosaka | H04L 12/2803 715/772 |
| 2011/0138444 A1 | 6/2011 | Kang et al. | |
| 2013/0053105 A1* | 2/2013 | Lee | H04M 1/673 455/565 |

(Continued)

FOREIGN PATENT DOCUMENTS

| | | |
|---|---|---|
| JP | 09-224293 | 8/1997 |
| JP | 10-233731 | 9/1998 |

(Continued)

OTHER PUBLICATIONS

Autoprotect—May 10, 2012.*

(Continued)

*Primary Examiner* — David Choi
(74) *Attorney, Agent, or Firm* — Rutan & Tucker, LLP

(57) ABSTRACT

According to one embodiment, a method is configured to be used for controlling an electronic device configured to operate an other electronic device, byway of example. The method includes displaying an operational interface for operating the other electronic device on a locked screen displayed in a display of the electronic device under a lock condition configured to restrict at least part of an operation on the electronic device, if it is determined that the electronic device has been connected to a first network corresponding to the other electronic device and the display of the electronic device is activated by an operation of a user.

6 Claims, 5 Drawing Sheets

(56) References Cited

U.S. PATENT DOCUMENTS

| | | | | |
|---|---|---|---|---|
| 2013/0145272 A1* | 6/2013 | Boggie | ............... | G06F 3/0487 |
| | | | | 715/728 |
| 2013/0167035 A1* | 6/2013 | Imes | ................. | F24F 11/0012 |
| | | | | 715/736 |
| 2013/0298032 A1* | 11/2013 | Sugaya | ................. | H04L 69/24 |
| | | | | 715/736 |
| 2013/0345981 A1* | 12/2013 | van Os | ............. | G01C 21/3626 |
| | | | | 701/540 |
| 2014/0123273 A1* | 5/2014 | Matus | .................... | G06F 21/32 |
| | | | | 726/17 |
| 2014/0215410 A1* | 7/2014 | Fleizach | .............. | G06F 3/017 |
| | | | | 715/863 |
| 2014/0380183 A1* | 12/2014 | Esaka | ................ | G06F 3/0481 |
| | | | | 715/740 |
| 2015/0133199 A1* | 5/2015 | Lee | .................. | G06Q 30/0241 |
| | | | | 455/566 |

FOREIGN PATENT DOCUMENTS

| | | |
|---|---|---|
| JP | 2007-110629 | 4/2007 |
| JP | 2009-134482 | 6/2009 |
| JP | 2010-74782 | 4/2010 |
| JP | 2013-41512 | 2/2013 |

OTHER PUBLICATIONS

International Search Report from corresponding PCT/JP2013/066884 application.
EPO, Extended European Search Report, Jan. 2, 2017.

\* cited by examiner

| | | | REGISTRATION INFORMATION DB | | 15a |
| --- | --- | --- | --- | --- | --- |
| DEVICE TYPE | NETWORK ID | DEVICE ID | PAIRING INFORMATION | CONNECTION PROTOCOL | LAST ACCESS TIME |

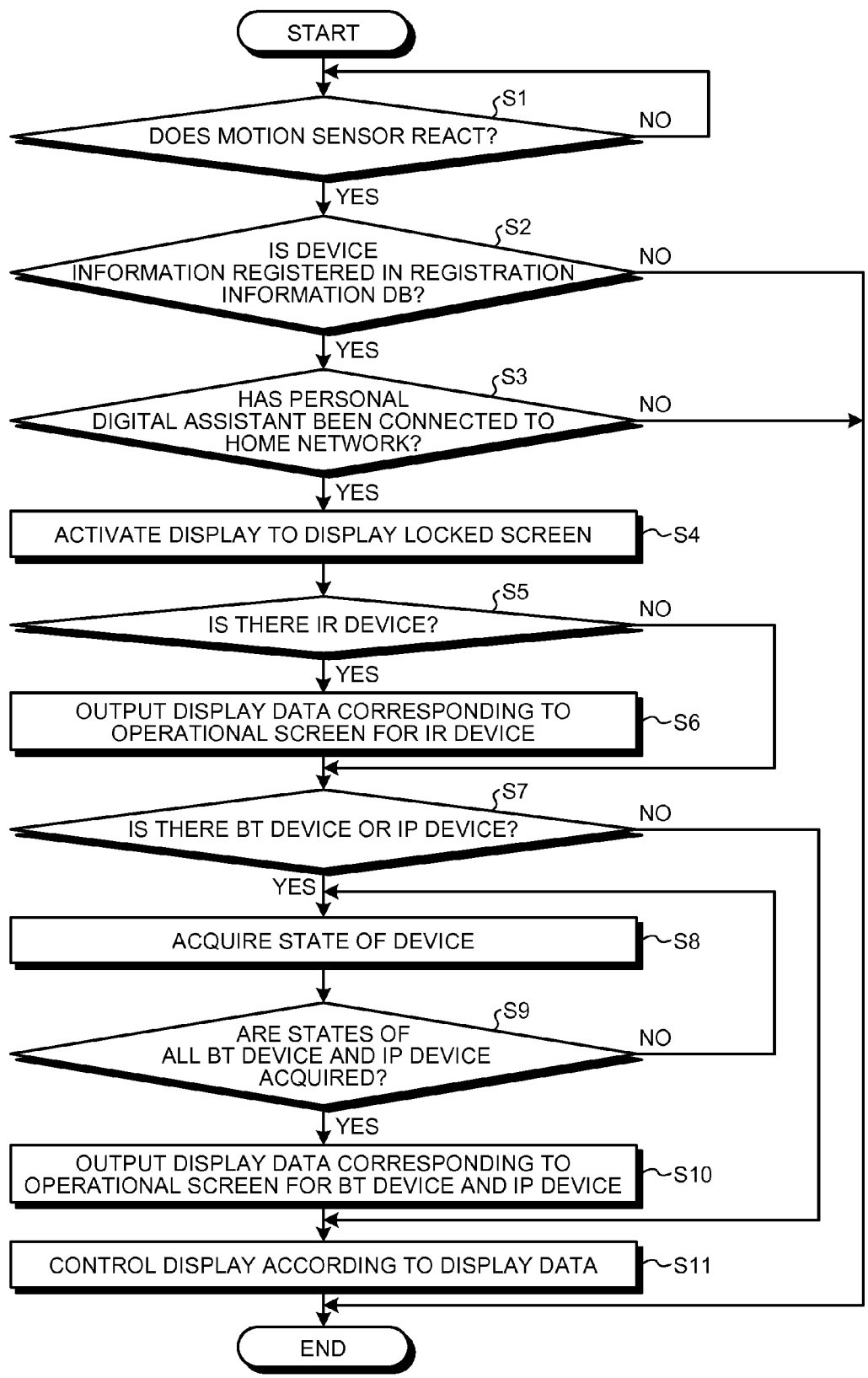

METHOD, ELECTRONIC DEVICE, AND COMPUTER PROGRAM PRODUCT

CROSS-REFERENCE TO RELATED APPLICATIONS

This application is a continuation of international application No. PCT/JP2013/066884, filed Jun. 19, 2013, which designates the United States, the entire contents of which are incorporated herein by reference.

FIELD

Embodiments described herein relate generally to a method, an electronic device, and a computer program product.

BACKGROUND

Conventionally, there has been known a technique for operating an electronic device (operation target device) such as a television device using an electronic device such as a personal digital assistant. In such a technique, generally, to display an operational screen for operating the operation target device on the personal digital assistant, it is necessary to perform operation of releasing operation restriction (lock) on the personal digital assistant and calling an application for operating the operation target device.

In the technique described above, as an example, it is desirable to reduce an operation burden on a user to display the operational screen for operating the operation target device on the personal digital assistant.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

FIG. 7 is an exemplary flowchart illustrating one example of a processing flow performed by a controller of the personal digital assistant in the embodiment.

DETAILED DESCRIPTION

In general, according to one embodiment, a method is configured to be used for controlling an electronic device configured to operate an other electronic device, by way of example. The method includes displaying an operational interface for operating the other electronic device on a locked screen displayed in a display of the electronic device under a lock condition configured to restrict at least part of an operation on the electronic device, if it is determined that the electronic device has been connected to a first network corresponding to the other electronic device and the display of the electronic device is activated by an operation of a user.

Hereinafter, an embodiment will be described based on drawings.

First, the following describes the configuration of a domestic remote control system 100 using a personal digital assistant (for example, a smart phone or a tablet computer) 10 according to the embodiment with reference to FIG. 1 to FIG. 6. The personal digital assistant 10 is an example of an "electronic device (information processing device)".

Figure 1:
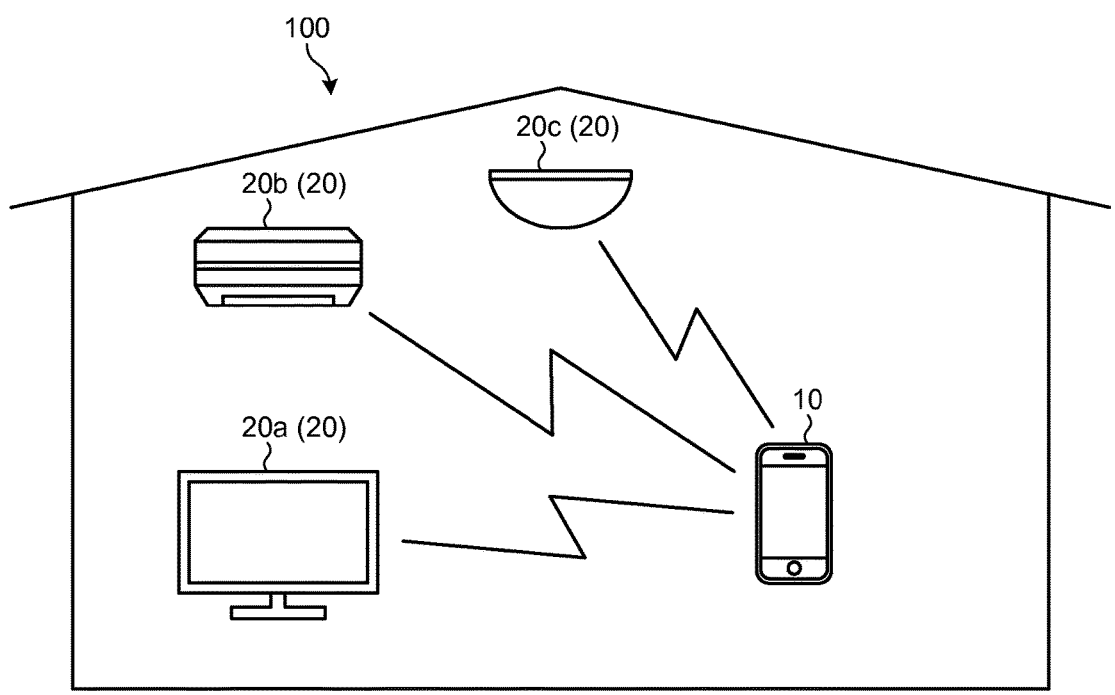
FIG. 1 is an exemplary schematic diagram illustrating one example of a configuration of a domestic remote control system using a personal digital assistant according to an embodiment.
Figure 2:
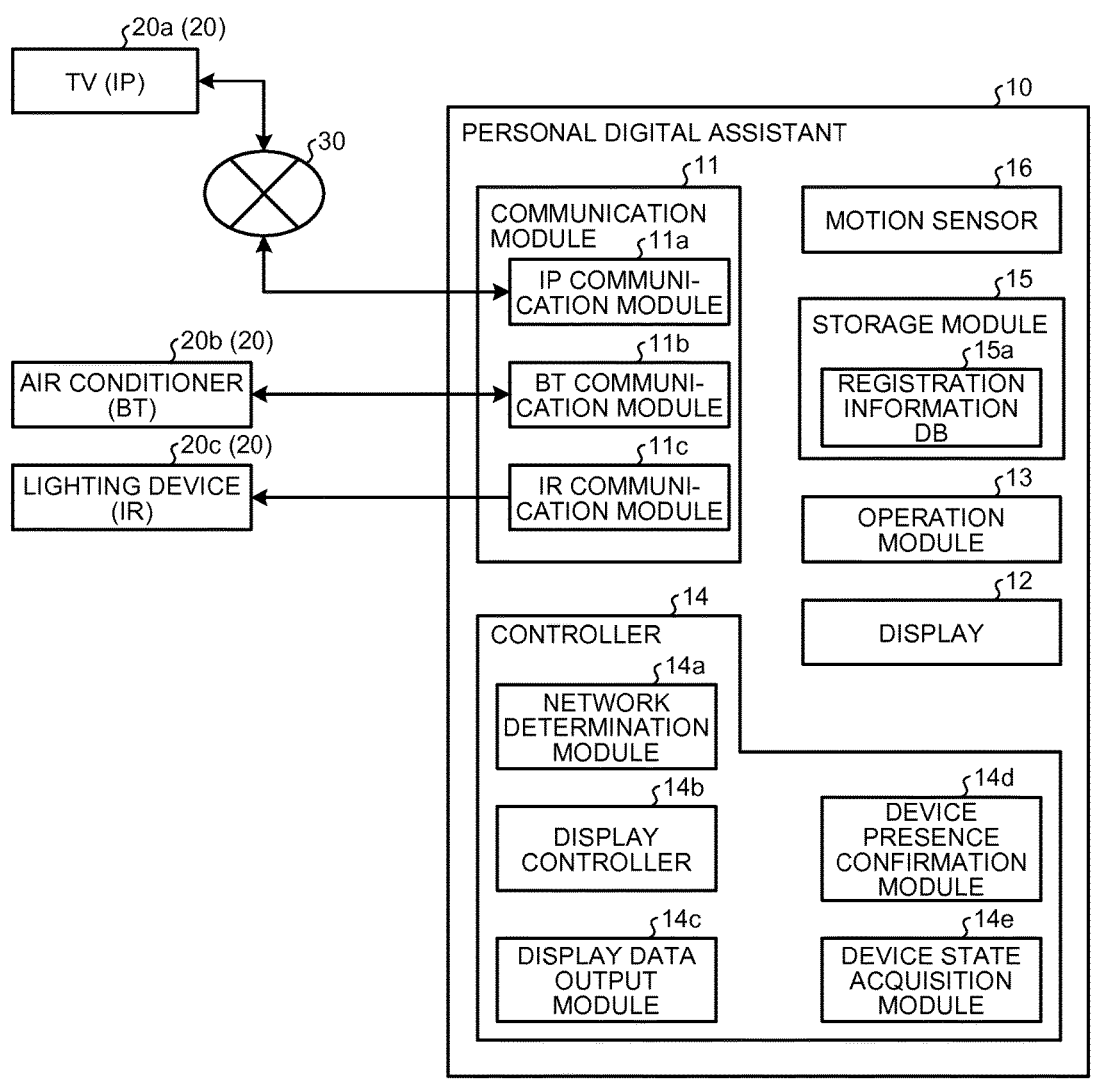
FIG. 2 is an exemplary block diagram illustrating one example of an internal structure of the personal digital assistant in the embodiment.
Figure 3:
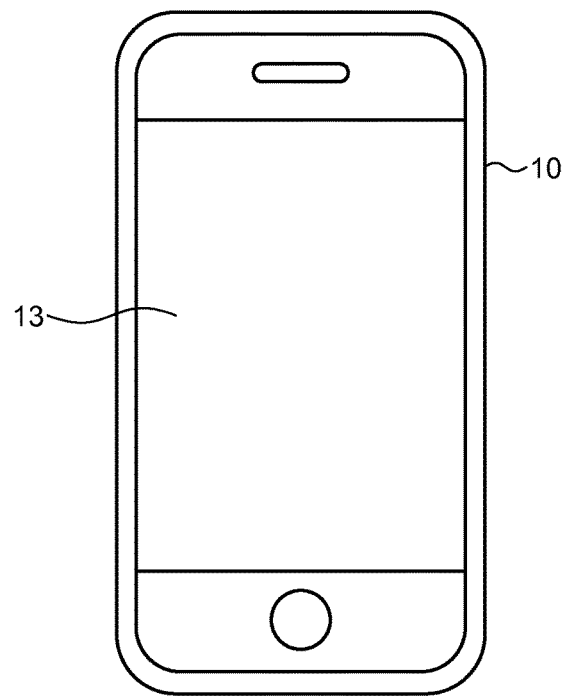
FIG. 3 is an exemplary diagram illustrating one example of a state in which no image is displayed on a display of the personal digital assistant in the embodiment.

As illustrated in FIG. 1, the domestic remote control system 100 comprises the personal digital assistant 10 and a plurality of operation target devices 20 (a television device (TV) 20a, an air conditioner (a cooling-heating device) 20b, and a lighting device 20c) installed at home. The operation target device 20 is an example of an "other electronic device". That is, each of the TV 20a, the air conditioner 20b, and the lighting device 20c is an example of the "other electronic device". As illustrated in FIG. 2, the personal digital assistant 10 comprises a communication module 11, a display 12, an operation module 13, a controller 14, a storage module 15, and a motion sensor 16. The motion sensor 16 is an example of a "sensor module".

The TV 20a has a function for performing IP (Internet Protocol) communication. The TV 20a is communicatably connected to a home network 30 comprising a router installed at home. The air conditioner 20b has a function for performing communication conforming to the Bluetooth (registered trademark) standard (hereinafter, referred to as BT communication). The lighting device 20c has a function for performing infrared (IR) communication.

In the present embodiment, the communication module 11 of the personal digital assistant 10 comprises an IP communication module 11a, a BT communication module 11b, and an IR communication module 11c. The IP communication module 11a is communicatably connected to the TV 20a via the home network 30. The IP communication module 11a is configured to be capable of transmitting a predetermined operation signal (remote control signal) to the TV 20a by performing IP communication. Similarly, the BT communication module 11b and the IR communication module 11c are communicatably connected to the air conditioner 20b and the lighting device 20c, respectively. The BT communication module 11b and the IR communication module 11c are configured to be capable of transmitting a predetermined operation signal to the air conditioner 20b and the lighting device 20c by performing the BT communication and the IR communication, respectively. As a result, a user can operate the operation target devices 20 (the TV 20a, the air conditioner 20b, and the lighting device 20c) by operating the operation module 13 of the personal digital assistant 10 (for example, operational screens IM2 to IM4 to be described later displayed on the display 12; refer to FIG. 5) to transmit an operation signal corresponding to the user's operation.

More specifically, when the personal digital assistant 10 is associated with each of the operation target devices 20, that is, when information about the operation target devices 20 (device information to be described later) is registered in a registration information DB (database) 15a stored in the storage module 15 of the personal digital assistant 10, the user can operate the operation target devices 20 (the TV 20a, the air conditioner 20b, and the lighting device 20c) by operating the personal digital assistant 10. For example, when the device information about the TV 20a is registered in the registration information DB 15a, the user can perform operations such as switching on/off of a power supply, selecting a channel, and adjusting the sound volume of the TV 20a by operating the personal digital assistant 10. When the device information about the air conditioner 20b is registered in the registration information DB 15a, the user can perform operations such as switching on/off of a power supply and adjusting the temperature of the air conditioner 20b by operating the personal digital assistant 10. When the device information about the lighting device 20c is registered in the registration information DB 15a, the user can perform operations such as switching on/off of a power supply and adjusting luminous intensity of the lighting device 20c by operating the personal digital assistant 10.

The display 12 of the personal digital assistant 10 comprises a liquid crystal panel that can display an image. The operation module 13 of the personal digital assistant 10 comprises a touch panel using the display 12. Hereinafter, an ON state represents a state in which the display 12 displays any image (a locked screen IM1 (refer to FIG. 4) to be described later, the operational screens IM2, IM3, and IM4 (refer to FIG. 5), or the like). An OFF state represents a state in which the display 12 displays no image (standby state; refer to FIG. 3). The display 12 is configured to be in the OFF state when the user leaves the personal digital assistant 10 unattended without any operation performed for a predetermined time or more.

The controller 14 of the personal digital assistant 10 is configured to control each module of the personal digital assistant 10. The controller 14 comprises a network determination module 14a, a display controller 14b, a display data output module 14c, a device presence confirmation module 14d, and a device state acquisition module 14e. Details of functions of the network determination module 14a, the display controller 14b, the display data output module 14c, the device presence confirmation module 14d, and the device state acquisition module 14e will be described later.

The storage module 15 of the personal digital assistant 10 comprises a read only memory (ROM), a random access memory (RAM), or the like. The storage module 15 is configured to store therein a computer program to be executed by the controller 14, various pieces of data used for executing the computer program, and the like. For example, the storage module 15 stores therein the registration information DB 15a (refer to FIG. 6) having a data structure as described below.

Figures 5, 6:
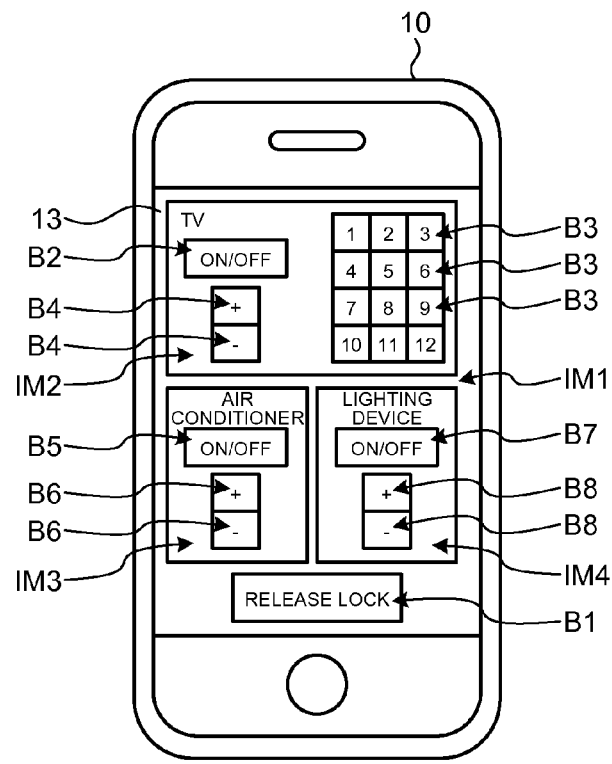
FIG. 5 is an exemplary diagram illustrating one example of a state in which an operational screen for operating an operation target device is displayed on the locked screen illustrated in FIG. 4, in the embodiment.
FIG. 6 is an exemplary diagram for explaining one example of a data structure of a registration information database (DB) stored in a storage module of the personal digital assistant in the embodiment.

Information (device information) about the operation target device 20 associated with the personal digital assistant 10, that is, information (device information) about the operation target device 20 registered as a device operable by the personal digital assistant 10 is registered in the registration information DB 15a. Specifically, as illustrated in FIG. 6, a device type, a network ID, a device ID, pairing information, a connection protocol, and the last access time of the operation target device 20 are registered in the registration information DB 15a in a state associated with each other.

The device type indicates a communication scheme supported by the operation target device 20, and examples thereof include the IP communication, the BT communication, and the IR communication. The network ID indicates identification information of a network to which the personal digital assistant 10 is connected when the operation target device 20 is registered as a device operable by the personal digital assistant 10, and examples thereof include a MAC address of a router in the home network 30. The device ID indicates identification information for specifying the operation target device 20 registered as a device operable by the personal digital assistant 10, and examples thereof include identification information such as a Universally Unique Identifier (UUID). The pairing information is used when the personal digital assistant 10 communicates with the operation target device 20, and examples thereof include authentication information such as a password. The connection protocol is a protocol used when the personal digital assistant 10 communicates with the operation target device 20. The last access time is the last access time to a network to which the personal digital assistant 10 is connected when the operation target device 20 is registered as a device operable by the personal digital assistant 10.

In the embodiment, the network determination module 14a of the controller 14 has a function of determining whether the communication module 11 is connected to a network (first network) registered in advance when the display 12 is in the OFF state caused by that the personal digital assistant 10 has been left unattended for a predetermined time or more at home for example. The network registered in advance is a network to which the communication module 11 is connected (for example, the home network 30 corresponding to the TV 20a to which the IP communication module 11a is connected) when the device information about the operation target device 20 is registered in the registration information DB 15a. When the network determination module 14a determines that the communication module (IP communication module 11a) is connected to the network registered in advance (the home network 30 corresponding to the TV 20a), the display controller 14b of the controller 14 performs control of activating the display 12 from the OFF state to the ON state to display the locked screen IM1 (refer to FIG. 4) on the display 12, and displays the operational screens IM2 to IM4 (refer to FIG. 5) for operating the operation target device 20 on the locked screen IM1. The locked screen IM1 and the operation module 13 are displayed based on display data output from the display data output module 14c of the controller 14.

The locked screen may be any screen configured to restrict at least part of operation on the personal digital assistant 10. Hereinafter, the locked screen is exemplified as the locked screen IM1 (refer to FIG. 4). Also, the locked screen may or may not comprise an operator for releasing the restriction on at least part of the operation on the personal digital assistant 10. The locked screen IM1 (refer to FIG. 4) is a screen configured to restrict the operation on the personal digital assistant 10, and the operation restriction on the personal digital assistant 10 can be released by the user pushing down (touching) a lock releasing button B1 displayed on the locked screen IM1. Each of the operational screens IM2 to IM4 (refer to FIG. 5) is a screen on which various buttons for operating the operation target device 20 are displayed, and the user can perform various operations on the operation target device 20 by performing an operation of pushing down the various buttons displayed on the operation module 13. For example, in the example illustrated in FIG. 5, the operational screen IM2 for operating the TV 20a displays a power supply button (a button on which the characters "ON/OFF" are displayed) B2 for switching on/off the power supply of the TV 20a, a plurality of channel selection buttons (buttons on which the numerals "1", "2", . . . , "12" are displayed) B3 for selecting channels of the TV 20*a*, and a sound volume adjustment button (a button on which the characters "+" and "−" are displayed) B4 for adjusting the sound volume of the TV 20*a*. The operational screen IM3 for operating the air conditioner 20*b* displays a power supply button (a button on which the characters "ON/OFF" are displayed) B5 for switching on/off the air conditioner 20*b*, and a temperature adjustment button (a button on which the characters "+" and "−" are displayed) B6 for adjusting the temperature of the air conditioner 20*b*. The operational screen IM4 for operating the lighting device 20*c* displays a power supply button (a button on which the characters "ON/OFF" are displayed) B7 for switching on/off the lighting device 20*c*, and a brightness adjustment button (a button on which the characters "+" and "−" are displayed) B8 for adjusting brightness of the lighting device 20*c*.

In the embodiment, the device presence confirmation module 14*d* of the controller 14 has a function for confirming whether there is the operation target device 20 operable using the personal digital assistant 10. When the network determination module 14*a* determines that the communication module 11 (for example, the IP communication module 11*a*) is connected to the network registered in advance (for example, the home network 30) and the device presence confirmation module 14*d* confirms that the operation target device 20 operable is present, the display controller 14*b* of the controller 14 performs control of activating the display 12 to display the locked screen IM1 (refer to FIG. 4) on the display 12 and displays the operational screens IM2 to IM4 (refer to FIG. 5) for operating the operation target device 20 on the locked screen IM1. The following briefly describes a method by which the device presence confirmation module 14*d* confirms the presence of the operation target device 20 operable.

To confirm whether there is the operation target device 20 (for example, the TV 20*a*) supporting the IP communication, the device presence confirmation module 14*d* firstly confirms whether the device information of the operation target device 20 supporting the IP communication is registered in the registration information DB 15*a*. When the device information of the operation target device 20 supporting the IP communication is registered in the registration information DB 15*a*, the device presence confirmation module 14*d* performs a predetermined query (a query of presence confirmation) on the operation target device 20 via the IP communication module 11*a*. When predetermined data corresponding to the query is returned from the operation target device 20 supporting the IP communication, the device presence confirmation module 14*d* determines that the operation target device 20 supporting the IP communication is present. Similarly, to confirm whether the operation target device 20 (for example, the air conditioner 20*b*) supporting the BT communication is present, the device presence confirmation module 14*d* firstly confirms whether the device information of the operation target device 20 supporting the BT communication is registered in the registration information DB 15*a*. When the device information of the operation target device 20 supporting the BT communication is registered in the registration information DB 15*a*, the device presence confirmation module 14*d* performs a predetermined query on the operation target device 20 via the BT communication module 11*b*. When predetermined data corresponding to the query is returned from the operation target device 20 supporting the BT communication, the device presence confirmation module 14*d* determines that the operation target device 20 supporting the BT communication is present. The IR communication is different from the IP communication and the BT communication in that the presence of the operation target device 20 cannot be confirmed by the method as described above. Accordingly, when the device information of the operation target device 20 supporting the IR communication is registered in the registration information DB 15*a*, the device presence confirmation module 14*d* automatically determines that the operation target device 20 (for example, the lighting device 20*c*) supporting the IR communication is present.

In the embodiment, the motion sensor 16 of the personal digital assistant 10 is configured to react when the personal digital assistant 10 is moved by the user and detect the movement of the personal digital assistant 10. Specifically, the motion sensor 16 detects acceleration directions (X-direction, Y-direction, and Z-direction) and magnitude of acceleration of the movement (motion) of the personal digital assistant 10 caused by the user's operation, and outputs them as detection signals. The motion sensor 16 reacts when the user lifts up the personal digital assistant 10 left unattended for a predetermined time or more at home (the personal digital assistant 10 of which display 12 is in the OFF state) to operate the operation target device 20. When the motion sensor 16 detects the movement of the personal digital assistant 10, when the network determination module 14*a* determines that the communication module 11 (IP communication module 11*a*) is connected to the network (home network 30) registered in advance, and when the device presence confirmation module 14*d* confirms that the operation target device 20 is present, the display controller 14*b* of the controller 14 then performs control of activating the display 12 to display the locked screen IM1 (refer to FIG. 4) on the display 12 and displays the operational screens IM2 to IM4 (refer to FIG. 5) for operating the operation target device 20 on the locked screen IM1.

In the embodiment, the device state acquisition module 14*e* of the controller 14 has a function for acquiring the state of the operation target device 20 of which presence is confirmed by the device presence confirmation module 14*d*. Herein, the state indicates an operation currently performed by the operation target device 20. When displaying the operational screens IM2 to IM4 (refer to FIG. 5) on the locked screen IM1, the display controller 14*b* of the controller 14 displays the operational screens IM2 to IM4 corresponding to the state of the operation target device 20 acquired by the device state acquisition module 14*e* on the locked screen IM1. For example, when the TV 20*a* is in a state of displaying and reproducing channel broadcasting such as a normal television program, as illustrated in FIG. 5, the operational screen IM2 displayed for operating the TV 20*a* comprises the power supply button B2 for switching on/off the power supply, the channel selection buttons B3 for selecting a channel, and the sound volume adjustment button B4 for adjusting the sound volume. Although not illustrated, when the TV 20*a* is in a state of displaying and reproducing video recorded in a recording medium such as a BD or a DVD for example, an operational screen comprising a pause button, a fast forward button, and a rewinding button for the video is displayed as the operational screen for operating the TV 20*a*. The state acquisition as described above can be performed in the BT communication and the IP communication that are bidirectional communication, but cannot be performed in the IR communication that is not bidirectional communication. That is, in the embodiment, the state of the air conditioner 20*b* supporting the BT communication and the state of the TV 20*a* supporting the IP communication can be acquired, but the state of the lighting device 20*c* supporting the IR communication cannot be acquired.

In the embodiment, when the device presence confirmation module 14d confirms that a plurality of operation target devices 20 are present, the display controller 14b of the controller 14 collectively displays the operational screens corresponding to the respective operation target devices 20 on the locked screen IM1. For example, in the example illustrated in FIG. 5, the device presence confirmation module 14d confirms the presence of three operation target devices 20, that is, the TV 20a, the air conditioner 20b, and the lighting device 20c. In the example illustrated in FIG. 5, the operational screen IM2 for operating the TV 20a, the operational screen IM3 for operating the air conditioner 20b, and the operational screen IM4 for operating the lighting device 20c are collectively displayed on the locked screen IM1.

Next, with reference to FIG. 7, the following describes a processing flow performed by the controller 14 of the personal digital assistant 10 according to the embodiment. The processing flow starts when the display 12 of the personal digital assistant 10 is in the OFF state caused by that the personal digital assistant 10 is left unattended for a predetermined time or more at home.

In this processing flow, first, processing is performed at S1 to determine whether the motion sensor 16 reacts as illustrated in FIG. 7. That is, the processing is performed to determine whether the user moves the personal digital assistant 10 left unattended for a predetermined time or more at home. The processing at S1 is repeated until it is determined that the motion sensor 16 reacts. If it is determined that the motion sensor 16 reacts at S1, the processing proceeds to S2.

The next processing is performed at S2 to determine whether the device information of the operation target device 20 is registered in the registration information DB 15a (refer to FIG. 6), that is, whether there is the operation target device 20 registered in the registration information DB 15a as a device operable by the personal digital assistant 10. If it is determined that the device information is not registered in the registration information DB 15a at S2, the processing ends. If it is determined that the device information is registered in the registration information DB 15a at S2, the processing proceeds to S3.

The next processing is performed at S3 to determine whether the personal digital assistant 10 (IP communication module 11a) has been connected to the network registered in advance (for example, the home network 30; refer to FIG. 2). If it is determined that the IP communication module 11a has not been connected to the home network 30 at S3, the process ends. If it is determined that the IP communication module 11a has been connected to the home network 30 at S3, the processing proceeds to S4.

The next processing is performed at S4 to activate the display 12 (refer to FIG. 3) from the OFF state to the ON state to display the locked screen IM1 (refer to FIG. 4) on the display 12. Then the process proceeds to S5.

The next processing is performed at S5 to determine whether there is the operation target device 20 supporting the IR communication (for example, the lighting device 20c; refer to FIG. 2). Specifically, the processing is performed to determine whether the device information of the operation target device 20 supporting the IR communication is registered in the registration information DB 15a. If it is determined that there is no operation target device 20 supporting the IR communication at S5, the processing proceeds to S7 to be described later. If it is determined that the operation target device 20 supporting the IR communication is present at S5, the processing proceeds to S6.

The next processing is performed at S6 to output display data corresponding to the operational screen for operating the operation target device 20 of which presence is confirmed in the processing at S5. For example, if the presence of the lighting device 20c supporting the IP communication (refer to FIG. 2) is confirmed in the processing at S5, the display data output module 14c outputs display data for displaying the operational screen IM4 as illustrated in FIG. 5 on the locked screen IM1. Then the processing proceeds to S7.

The next processing is performed at S7 to determine whether there is the operation target device 20 supporting the BT communication (for example, the air conditioner 20b; refer to FIG. 2) or the operation target device 20 supporting the IP communication (for example, the TV 20a; refer to FIG. 2). Specifically, in an example in which it is determined whether there is the operation target device 20 supporting the BT communication, it is confirmed whether the device information of the operation target device 20 supporting the BT communication is registered in the registration information DB 15a. If the device information of the operation target device 20 supporting the BT communication is registered in the registration information DB 15a, a predetermined query (a query of presence confirmation) is performed on the operation target device 20 via the BT communication module 11b. If predetermined data corresponding to the query is returned from the operation target device 20 supporting the BT communication, it is determined that the operation target device 20 supporting the BT communication is present. Similarly, also in a case in which it is determined whether there is the operation target device 20 supporting the IP communication, it is confirmed whether the device information of the operation target device 20 supporting the IP communication is registered in the registration information DB 15a. If the device information of the operation target device 20 supporting the IP communication is registered in the registration information DB 15a, a predetermined query (a query of presence confirmation) is performed on the operation target device 20 via the IP communication module 11a. If predetermined data corresponding to the query is returned from the operation target device 20 supporting the IP communication, it is determined that the operation target device 20 supporting the IP communication is present.

If it is determined that there is no operation target device 20 supporting the BT communication or no operation target device 20 supporting the IP communication at S7, the processing proceeds to S11 to be described later. If it is determined that the operation target device 20 supporting the BT communication or the operation target device 20 supporting the IP communication is present at S7, the processing proceeds to S8.

The next processing is performed at S8 to acquire the state of the operation target device 20 of which presence is confirmed in the processing at S7. For example, the processing is performed to acquire information about how the operation target device 20 supporting the IP communication (or the BT communication) currently operates, for example, whether the TV 20a supporting the IP communication is in a state of displaying and reproducing channel broadcasting such as a normal television program. Then the processing proceeds to S9.

The next processing is performed at S9 to determine whether the state acquisition processing at S8 is performed on all the operation target devices 20 (the operation target devices 20 supporting the BT communication or the IP communication) of which presence is confirmed in the processing at S7. At S9, if it is determined that the state of all the operation target devices 20 supporting the BT communication or the IP communication is not acquired, that is, if there is the operation target device 20 of which state is not acquired yet, the processing returns to S8, and then the processing is performed to acquire the state of the operation target device 20 that is not acquired yet. At S9, if it is determined that the state of all the operation target devices 20 supporting the BT communication or the IP communication is acquired, the processing proceeds to S10.

The next process is performed at S10 to output display data corresponding to the operational screen for operating the operation target device 20 of which presence is confirmed in the processing at S7 and the state thereof is acquired in the processing at S8. For example, if it is confirmed at S7 that the TV 20a (refer to FIG. 2) supporting the IP communication and the air conditioner 20b (refer to FIG. 2) supporting the BT communication are present, and if the states of the TV 20a and the air conditioner 20b are acquired at S8, the display data output module 14c outputs the display data for displaying the operational screens IM2 and IM3 as illustrated in FIG. 5 on the locked screen IM1. Then the processing proceeds to S11.

The next process is performed at S11 to control the display 12 according to the display data output from the display data output module 14c in the processing at S6 or S10. For example, if the display data corresponding to the operational screen IM4 (refer to FIG. 5) is output at S6 and the display data corresponding to the operational screens IM2 and IM3 (refer to FIG. 5) is output at S10, the processing is performed to control the display 12 to collectively display the operational screens IM2 to IM4 on the locked screen IM1. If the display data corresponding to the operational screens IM2 to IM4 is not output, no operational screen is displayed on the locked screen IM1, and the state in which the locked screen IM1 is displayed on the display 12 is maintained as it is. Then the processing ends.

Figure 4:
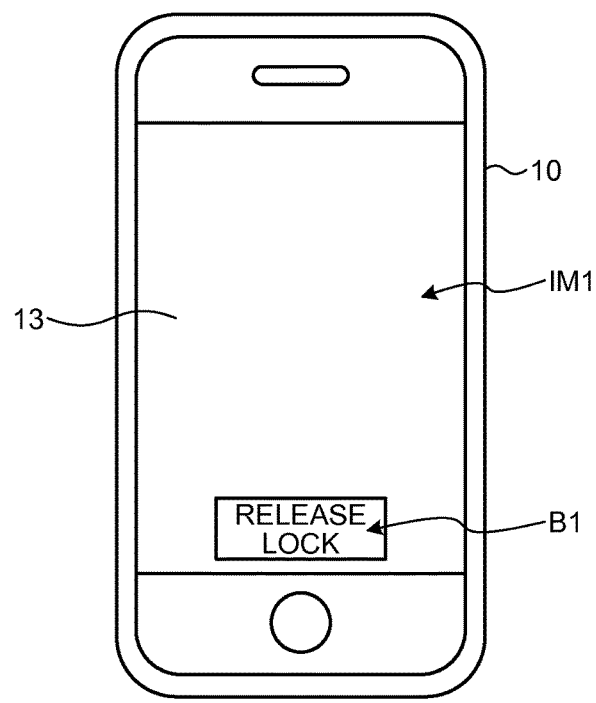
FIG. 4 is an exemplary diagram illustrating one example of a locked screen displayed on the display of the personal digital assistant in the embodiment.

As described above, in the embodiment, when the network determination module 14a determines that the communication module 11 (IP communication module 11a) is connected to the network registered in advance (first network; the home network 30 corresponding to the TV 20a), the display controller 14b performs control of activating the display 12 to display the locked screen IM1 (refer to FIG. 4) configured to restrict operation on the personal digital assistant 10 on the display 12, and displays the operational screens (refer to operational screens IM2 to IM4 in FIG. 5) for operating the operation target device 20 on the locked screen IM1 (refer to FIG. 4). Accordingly, by way of example, when the communication module 11 is connected to the network registered in advance, the operational screen for operating the operation target device 20 is displayed on the locked screen IM1, so that it is not necessary to perform operation of releasing operation restriction (lock) of the personal digital assistant 10 and calling an application for operating the operation target device 20 to operate the operation target device 20 using the personal digital assistant 10. As a result, by way of example, an operation burden on the user can be reduced in displaying the operational screen for operating the operation target device 20 on the display 12.

In the embodiment, as described above, when the network determination module 14a determines that the communication module 11 is connected to the network registered in advance and the device presence confirmation module 14d confirms that the operation target device 20 operable is present, the display controller 14b performs control of activating the display 12 to display the operational screens (refer to the operational screens IM2 to IM4 in FIG. 5) for operating the operation target device 20 of which presence is confirmed on the locked screen IM1 (refer to FIG. 4). Accordingly, by way of example, the operational screens of the operation target device 20 that can be securely operated by using the personal digital assistant 10 can be displayed on the locked screen IM1, so that convenience of the user can be improved.

In the embodiment, as described above, when the motion sensor 16 detects the movement of the personal digital assistant 10 and the network determination module 14a determines that the communication module 11 is connected to the network registered in advance, the display controller 14b performs control of activating the display 12 to display the operational screens (refer to operational screens IM2, IM3, and IM4 in FIG. 5) for operating the operation target device 20 on the locked screen IM1 (refer to FIG. 4). Accordingly, by way of example, when the user lifts up the personal digital assistant 10 with his/her hand to operate the operation target device 20 using the personal digital assistant 10, the operational screen for operating the operation target device 20 is displayed, so that the convenience of the user can be improved because the operational screen is displayed at an appropriate timing following intention of the user.

In the embodiment, as described above, upon displaying the operational screens (refer to the operational screens IM2 to IM4 in FIG. 5) for operating the operation target device 20 on the locked screen IM1 (refer to FIG. 4), the display controller 14b performs control of displaying the operational screen corresponding to the state of the operation target device 20 (information about how the operation target device 20 currently operates) acquired by the device state acquisition module 14e on the locked screen IM1. Accordingly, an appropriate operational screen can be displayed corresponding to the state of the operation target device 20, so that the convenience of the user can be improved.

In the embodiment, as described above, when the device presence confirmation module 14d confirms that a plurality of operation target devices 20 are present (for example, when it is confirmed that three operation target devices 20 such as the TV 20a, the air conditioner 20b, and the lighting device 20c are present), the display controller 14b performs control of collectively displaying the operational screens (refer to the operational screens IM2 to IM4 in FIG. 5) corresponding to the respective operation target devices 20 on the locked screen IM1 (refer to FIG. 4). Accordingly, the operational screens (operational screens IM2 to IM4) corresponding to the operation target devices 20 are collectively displayed on one screen (locked screen IM1), so that the convenience of the user can be improved because the user can operate the operation target devices 20 without switching the screen and the like.

The personal digital assistant according to the embodiment described above has a hardware configuration utilizing a general computer, and a computer program executed by the controller of the personal digital assistant is stored in the storage module comprising a ROM or a RAM. The computer program is recorded in a computer-readable recording medium such as a CD-ROM, a flexible disk (FD), a CD-R, and a digital versatile disk (DVD) as an installable file or an executable file to be provided. The computer program may be configured to be stored on a computer connected to a network such as the Internet and provided or distributed via the network. The computer program may be configured to be provided being incorporated in a ROM and the like in advance.

For example, the above embodiment describes an example in which the present technology is applied to the personal digital assistant as an example of the electronic device. However, the present technology may also be applied to an electronic device (for example, a personal computer (PC) and the like) other than the personal digital assistant. The embodiment describes a case of using, as an example of the operation target device, the TV supporting the IP communication, the air conditioner supporting the BT communication, and the lighting device supporting the IR communication. However, in the present technology, other electronic devices (for example, a video recording device and the like) may be used as the operation target device. The operation target device of the present technology may be an electronic device supporting other communication scheme (for example, ZigBee (registered trademark) and the like).

In the embodiment, when it is determined that the personal digital assistant is connected to the network registered in advance (home network corresponding to the TV) and the display of the personal digital assistant is activated, the processing of displaying the operational screen on the locked screen is necessarily performed. However, in the present technology, the processing of displaying the operational screen on the locked screen is not necessarily performed in the case described above.

In the embodiment, a criteria of determining whether the personal digital assistant is connected to the home network as a network registered in advance (network corresponding to the TV) is used as one of criterion of determining whether to display the operational screen on the locked screen. However, in the present technology, when a network other than the home network is registered in advance, whether the personal digital assistant is connected to the network registered in advance other than the home network may be used as one of the criterion of determining whether to display the operational screen on the locked screen.

In the example according to the embodiment, when a plurality of electronic devices (three devices such as the TV, the air conditioner and the lighting device) operable by using the personal digital assistant are present, a plurality of operational screens corresponding to the electronic devices are collectively displayed on the locked screen. However, in the present technology, all the operational screens may not be collectively displayed on the locked screen, and one or more (for example, two) of the operational screens may be displayed on the locked screen.

The number of components in the above embodiment may be appropriately changed. That is, in the embodiment, one operation target device (TV) supporting the IP communication, one operation target device (air conditioner) supporting the BT communication, and one operation target device (lighting device) supporting the IR communication are provided. However, in the present technology, two or more operation target devices supporting the IP communication, two or more operation target devices supporting the BT communication, and two or more operation target devices supporting the IR communication may be provided.

In the embodiment, the device type, the network ID, the device ID, the pairing information, the connection protocol, and the last access time are registered in the registration information DB. However, in the present technology, a piece of information other than the above six pieces of information may be registered in the registration information DB as long as it is a piece of information that associates the personal digital assistant and the operation target device.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of an electronic apparatus configured to remotely operate a first electronic apparatus different from the electronic apparatus, the method comprising:
    displaying, on a screen of the electronic apparatus, a locked screen under a lock condition of the electronic apparatus, wherein a part of functions of the electronic apparatus are not usable under the lock condition;
    displaying, on the screen of the electronic apparatus, an unlocked screen under an unlock condition of the electronic apparatus, wherein the part of functions of the electronic apparatus are usable under the unlock condition;
    determining whether the electronic apparatus is connected with a first network of the first electronic apparatus under the lock condition;
    displaying, upon confirmation that a plurality of electronic apparatuses are present, at least one of a plurality of operational interfaces corresponding to the first electronic apparatus on the locked screen; and
    automatically activating the screen of the electronic apparatus to display an operational interface to remotely operate the first electronic apparatus different from the electronic apparatus on the locked screen under the lock condition, if it is determined that the electronic apparatus is connected with the first network and movement of the electronic apparatus is detected and it is confirmed that the first electronic apparatus is present, wherein
    the operational interface on the locked screen is not usable under the lock condition, if it is determined that the electronic apparatus is not connected with the first network.

2. The method of claim 1, further comprising:
    acquiring a state of the first electronic apparatus; and
    displaying the operational interface corresponding to the state of the other first electronic apparatus on the locked screen.

3. An electronic apparatus configured to remotely operate a first electronic apparatus different from the electronic apparatus, the electronic apparatus comprising:
    a screen;
    a sensor configured to detect movement of the electronic apparatus; and
    processing circuitry configured:
        to display, on a screen of the electronic apparatus, a locked screen under a lock condition of the electronic apparatus, wherein a part of functions of the electronic apparatus are not usable under the lock condition;
        to display, on the screen of the electronic apparatus, an unlocked screen under an unlock condition of the electronic apparatus, wherein the part of functions of the electronic apparatus are usable under the unlock condition;

to determine whether the electronic apparatus is connected with a first network of the first electronic apparatus under the lock condition;

to display, upon confirmation that a plurality of electronic apparatuses are present, at least one of a plurality of operational interfaces corresponding to the first electronic apparatus on the locked screen; and to automatically activate the screen of the electronic apparatus to display an operational interface to remotely operate the first electronic apparatus different from the electronic apparatus on the locked screen under the lock condition, if it is determined that the electronic apparatus is connected with the first network and the movement of the electronic apparatus is detected and it is confirmed that the first electronic apparatus is present, wherein the operational interface on the locked screen is not usable under the lock condition, if it is determined that the electronic apparatus is not connected with the first network.

4. The electronic apparatus of claim 3, wherein the processing circuitry is configured:

to acquire a state of the first electronic apparatus; and to display the operational interface corresponding to the state of the first electronic apparatus on the locked screen.

5. The electronic apparatus of claim 3, further comprising:

a communication module configured to be capable of performing network communication, wherein the processing circuitry is configured to activate the screen to display the operational interface on the locked screen if it is determined that the communication module is connected with the first network.

6. A computer program product of an electronic apparatus configured to remotely operate a first electronic apparatus different from the electronic apparatus, the computer program product having a non-transitory computer readable medium including programmed instructions, wherein the instructions, when executed by a computer, cause the computer to perform:

displaying, on a screen of the electronic apparatus, a locked screen under a lock condition of the electronic apparatus, wherein a part of functions of the electronic apparatus are not usable under the lock condition;

displaying, on the screen of the electronic apparatus, an unlocked screen under an unlock condition of the electronic apparatus, wherein the part of functions of the electronic apparatus are usable under the unlock condition;

determining whether the electronic apparatus is connected with a first network of the first electronic apparatus under the lock condition;

displaying, upon confirmation that a plurality of electronic apparatuses are present, at least one of a plurality of operational interfaces corresponding to the first electronic apparatus on the locked screen; and automatically activating the screen of the electronic apparatus to display an operational interface to remotely operate the first electronic apparatus different from the electronic apparatus on the locked screen under the lock condition, if it is determined that the electronic apparatus is connected with the first network and movement of the electronic apparatus is detected and it is confirmed that the first electronic apparatus is present, wherein the operational interface on the locked screen is not usable under the lock condition, if it is determined that the electronic apparatus is not connected with the first network.

* * * * *